United States Patent
Davis et al.

(10) Patent No.: US 6,622,455 B2
(45) Date of Patent: Sep. 23, 2003

(54) ROUND BALER WITH SEMI-AUTOMATICALLY SEQUENCED OPERATING CYCLES AND SELECTIVELY VARIABLE POINT OF OPERATOR INTERVENTION

(75) Inventors: Robert D. Davis, Hesston, KS (US); Robert J. Waggoner, Wichita, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 09/945,390

(22) Filed: Aug. 31, 2001

(65) Prior Publication Data

US 2002/0029542 A1 Mar. 14, 2002

Related U.S. Application Data

(60) Provisional application No. 60/232,064, filed on Sep. 12, 2000.

(51) Int. Cl.[7] .............................................. B65B 13/02
(52) U.S. Cl. ............................... 53/399; 100/4; 100/5; 100/7; 100/99
(58) Field of Search ..................... 53/399; 100/4, 100/5, 7, 99

(56) References Cited

U.S. PATENT DOCUMENTS

| | | | |
|---|---|---|---|
| 4,656,931 A | * | 4/1987 | Van Den Bossche et al. . 172/75 |
| 4,674,403 A | | 6/1987 | Bryant et al. |
| 4,855,924 A | * | 8/1989 | Strosser et al. ................. 100/4 |

FOREIGN PATENT DOCUMENTS

| | | | | |
|---|---|---|---|---|
| DE | 44 42 479 | * | 1/1995 | ........... A01F/15/08 |

OTHER PUBLICATIONS

New Holland Roll–Belt Round Balers 634 644 654 664 (p. 1–24 Including Front and Back Covers) 1995.

* cited by examiner

Primary Examiner—Rinaldi I. Rada
Assistant Examiner—Gloria R Weeks
(74) Attorney, Agent, or Firm—Hovey Williams LLP

(57) ABSTRACT

A semi-automatic round baler having an "auto kick" or "auto wrap" mode. In the auto kick mode, at the conclusion of the forming cycle the baler will stop and await the operator's signal to continue. Once the operator has signaled to continue, the baler will wrap the bale and will immediately proceed to the ejecting cycle. In auto wrap mode, the baler will automatically enter into and complete the wrapping cycle (after a short delay) following completion of the forming cycle. At the conclusion of the wrapping cycle in the auto wrap mode, the baler will await the operator's signal before ejecting the completed bale.

3 Claims, 4 Drawing Sheets

ROUND BALER WITH SEMI-AUTOMATICALLY SEQUENCED OPERATING CYCLES AND SELECTIVELY VARIABLE POINT OF OPERATOR INTERVENTION

RELATED APPLICATION

The present application relates to and claims priority with regard to all common subject matter of the provisional patent application titled "ROUND BALER WITH SEMI-AUTOMATICALLY SEQUENCED OPERATING CYCLES AND SELECTIVELY VARIABLE POINT OF OPERATOR INTERVENTION," Serial No. 60/232,064, filed Sep. 12, 2000. The identified provisional patent application is hereby incorporated into the present application by reference.

TECHNICAL FIELD

BACKGROUND

1. Field of the Invention

The present invention relates generally to semi-automatically controlled round balers, and, more particularly, to round balers with semi-automatically sequenced operating cycles and a selectively variable stopping point in the sequence of cycles at which operator intervention is required before the sequence is resumed.

2. Discussion of Prior Art

There are three major cycles in the operation of a round baler. These are forming the bale, wrapping the bale, and ejecting the bale. Typically, in the forming cycle the operator lowers the crop pickup at the front edge of the baler, starts the bale forming belts and drives the tractor forward so that the crop pick-up can lift the crop into the baler. As the baler moves forward a hay bale is created within the bale chamber. If the operator drives straight while traversing the windrow an uneven bale may be created with more material in the center or one side of the bale than in the remainder of the bale. To prevent this uneven bale formation, the operator follows a driving pattern that includes spending time to the right of the center of the window and time to the left of center. Once the bale is fully formed, the forming cycle is complete and the wrapping cycle may begin. During the wrapping cycle forward motion along the windrow is stopped and either mesh or twine are wrapped around the bale using an automated mechanism associated with the bale chamber. Once wrapping is complete, the bale ejecting cycle begins in which the bale chamber is opened, typically by lifting a tailgate, and the wrapped bale falls or is pushed out of the bale chamber.

The prior art includes round balers that are fully automatic with respect to the three major cycles of operation. That is, an operator begins the process and drives a tractor towing the baler, but the baler automatically proceeds from one cycle to the next while signaling the operator with status information.

The prior art also includes a baler commercialized by AGCO Corporation of Duluth, Ga. that is semi-automatic with respect to these three cycles, i.e., after the forming cycle is complete, the machine does not automatically advance to the wrapping cycle but instead requires the operator to intervene and manually signal the baler to begin the next cycle. Once the operator has intervened in this manner, the AGCO baler completes the wrapping cycle, automatically moves into the ejecting cycle, and after completing the ejecting cycle automatically moves into the forming cycle. Of course, although the machine is in the forming cycle, no baling actually occurs unless the operator is driving the baler along the windrow so that material is picked up by the baler and formed into a bale.

An advantage of this baler is that in some instances the operator would prefer that the baler not proceed immediately to the wrapping cycle to allow time to ensure an even bale after he receives the signal that the bale is fully formed. By not automatically proceeding to the wrapping cycle the operator has time to drive from one position in the row to a different position in the row to even out the bale. The operator signals the baler to enter the wrapping cycle once the evening out process has been completed. Furthermore, depending on field conditions and other factors, the operator may have a need to postpone the wrapping cycle after the forming cycle is completed. However, this baler when operating in semi-automatic mode does not permit the operator to postpone the ejecting cycle.

Another prior art semi-automatic baler commercialized by Deere & Company of Moline, Ill. places the point of operator intervention between the wrapping cycle and the ejecting cycle so that the operator must affirmatively signal the baler at the conclusion of the wrapping cycle before the baler will commence the ejecting cycle. An advantage of this baler is that the operator can postpone the ejecting cycle if he so chooses. For example, fully formed bales can weigh in excess of 1000 pounds and it may not be safe to eject the bale automatically where the baler sits. If the baler is sitting on an incline it may not be safe to have a one thousand pound bale rolling down a hill. However, the Deere baler does not permit the operator to postpone the wrapping cycle if so desired by the operator.

SUMMARY OF THE INVENTION

The present invention solves the above described problems and provides a distinct advance in the art of round balers. More particularly, the present invention provides a semi-automatic round baler in which the manual intervention by which the operator commences the next cycle can be selectively placed either between the forming cycle and the wrapping cycle, or between the wrapping cycle and the ejecting cycle. The present invention can be implemented in hardware, software, firmware, or a combination thereof. In a preferred embodiment, certain aspects of the invention are implemented with a computer program in association with a computer or microcontroller.

The invention broadly includes a round baler and a controller that an operator can program to operate in one of two semi-automatic modes. The operator can select either the "auto kick" or the "auto wrap" mode. If the operator selects the auto kick mode, at the conclusion of the forming cycle the baler will stop and await the operator's signal to continue by pressing a console key, or a remote control switch. Once the operator has signaled to continue, the baler will wrap the bale and will immediately proceed to the ejecting cycle. If the operator selects the auto wrap mode, the baler will automatically enter into and complete the wrapping cycle following completion of the forming cycle. At the conclusion of the wrapping cycle in the auto wrap mode, the baler will wait until the operator manually depresses the console key or the remote switch before ejecting the completed bale.

BRIEF DESCRIPTION OF THE DRAWINGS

A preferred embodiment of the invention is described in detail below with reference to the attached drawing figures, wherein.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
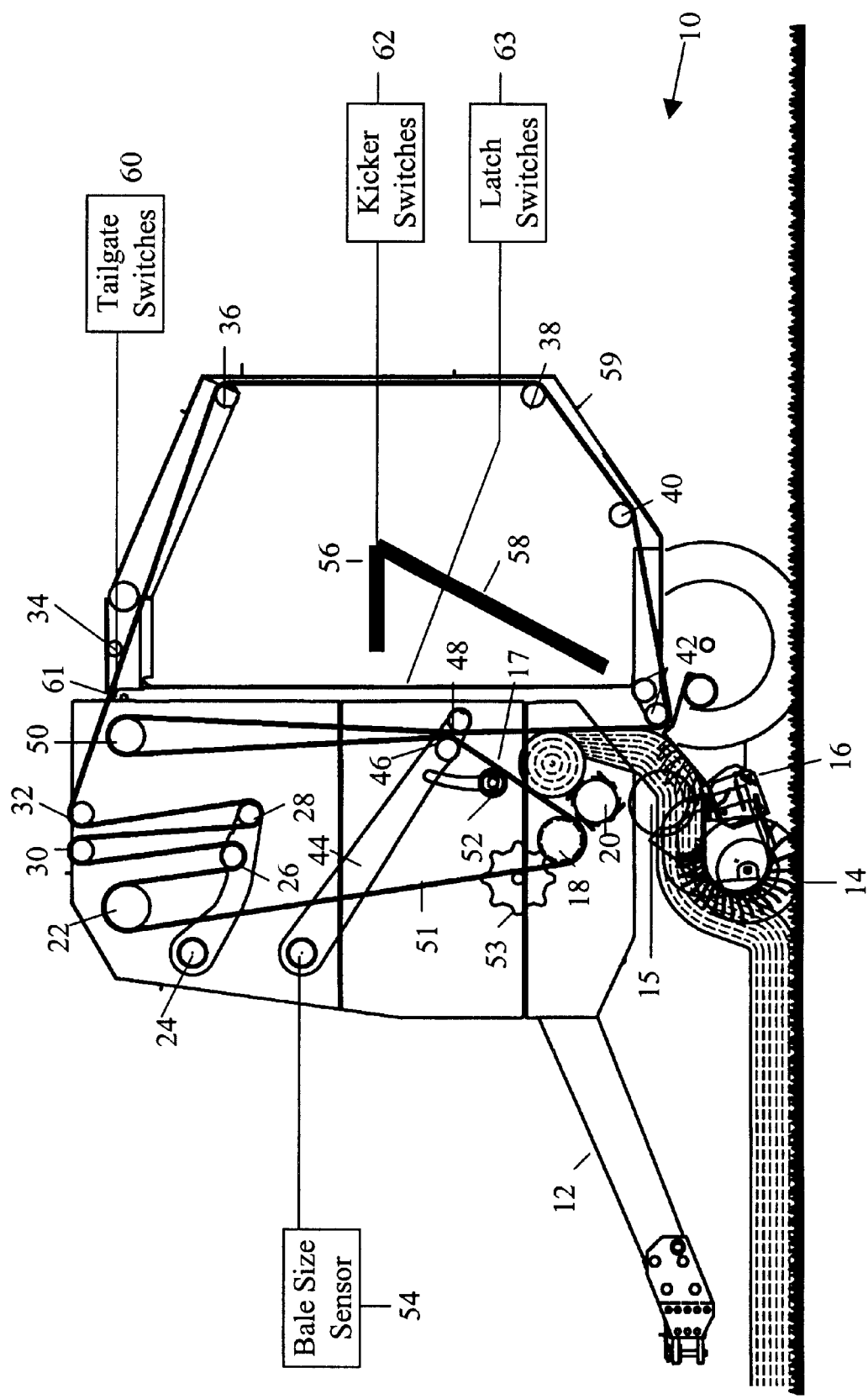
FIG. 1 is a schematic side elevational view of a round baler incorporating the present invention in operation with the near sidewall removed to reveal mechanism inside the baler.

Referring now to the drawings for a more detailed description of the preferred embodiment of the invention, FIG. 1 shows an exemplary round baler of the type having an expandable chamber defined by belts and rollers. Round balers of this general configuration are common in the prior art, as is exemplified by the structure disclosed in U.S. Pat. No. 5,855,167 issued to Goossen, et al., on Jan. 5, 1999. The '167 patent is hereby incorporated by reference into the present specification. As those skilled in the art will appreciate, the present invention is usable with fixed chamber round balers as well.

Round baler 10 includes a front tongue 12 for connecting to a tractor (not shown) so that the baler may be towed through a field. The tongue 12 of the baler also connects to power take off shaft of the tractor to supply energy to an onboard hydraulic pump of the round baler as will be understood by one of ordinary skill in the art. The baler has a pick-up assembly 14 including a center-gathering stub auger 15. The baler also includes a stuffer assembly 16 for moving the crop into a bale chamber 17.

Inside the baler are a lower drive roll 18 and a starting roll 20. Above the lower drive roll is the upper drive roll 22. Pivotally mounted within the baler is a belt tension arm 24 to which are pivotally mounted the front belt tension roll 26 and the rear belt tension roll 28. At the top of the front portion of the bale chamber is a front upper idler roll 30 and a rear upper idler roll 32. Following the interior of the baler wall around clockwise, there is a tailgate belt roll 34, an upper rear tailgate roll 36, a lower rear tailgate roll 38, a lower tailgate idler roll 40, and two front lower idler rolls 42. A bale density arm 44 is pivotally mounted within the baler and has a front bale density roll 46 and a rear bale density roll 48, both pivotally mounted on the distal end from the pivotal mounting of the bale density arm. Near the top of the bale chamber above the bale density rolls is depicted an upper bale chamber roll 50. A plurality of bale forming belts 51 (one shown in profile) are threaded around each of the above identified rolls as depicted in FIG. 1. The bale forming belts are tensioned by the front and rear belt tension rolls 26, 28, the rolls 46, 48 mounted on the bale density arm 44, and three of the belts are also affected by a bale shape assembly wheel 52. Also shown in profile is one of a plurality of rienks 53 which help keep the forming belts clean. The rienks are mounted on a shaft driven by the bottom drive roll sprocket (not shown). The rienks are spaced between the forming belts and serve to clean loose crop from between the forming belts during baling.

The baler includes a tailgate 59 that opens and closes around pivot point 61. A bale kicker assembly 56 (shown schematically) is associated with the tailgate. The bale kicker assembly includes the bale push bar 58 (depicted in its home position) and two hydraulic cylinders (not shown). The bale kicker is used to prevent contact between the tailgate 59 and the bale when the tailgate is closing. As the tailgate rises, hydraulic pressure is applied to the base end of the kicker hydraulic cylinders. The bale push bar 58 rises upward and rearward pushing the bale away from the tailgate as the tailgate closes. After the tailgate is closed the kicker is returned to its home position.

Associated with the bale density arm 44 is a bale size sensor 54 (shown schematically) that detects the angular position of the bale density arm and sends signals to the electronic control system to indicate bale size during the formation cycle. In addition, the baler includes tailgate switches 60 (shown schematically) that detect the position of the tailgate whether opened or closed, kicker switches 62 (shown schematically) that detect the position of the kicker whether out or home, and latch switches 63 (shown schematically) that detect whether the tailgate is latched. The tailgate and kicker switches cause signals to be sent to the electronic control system indicating the status of the elements to which they are connected.

In addition to the elements described above, the baler also contains a hydraulic pump, clutch assembly, and control electronics, none of which are shown in FIG. 1 but which are necessary for operation of the baler as will be understood by one of ordinary skill in the art.

Figure 2:
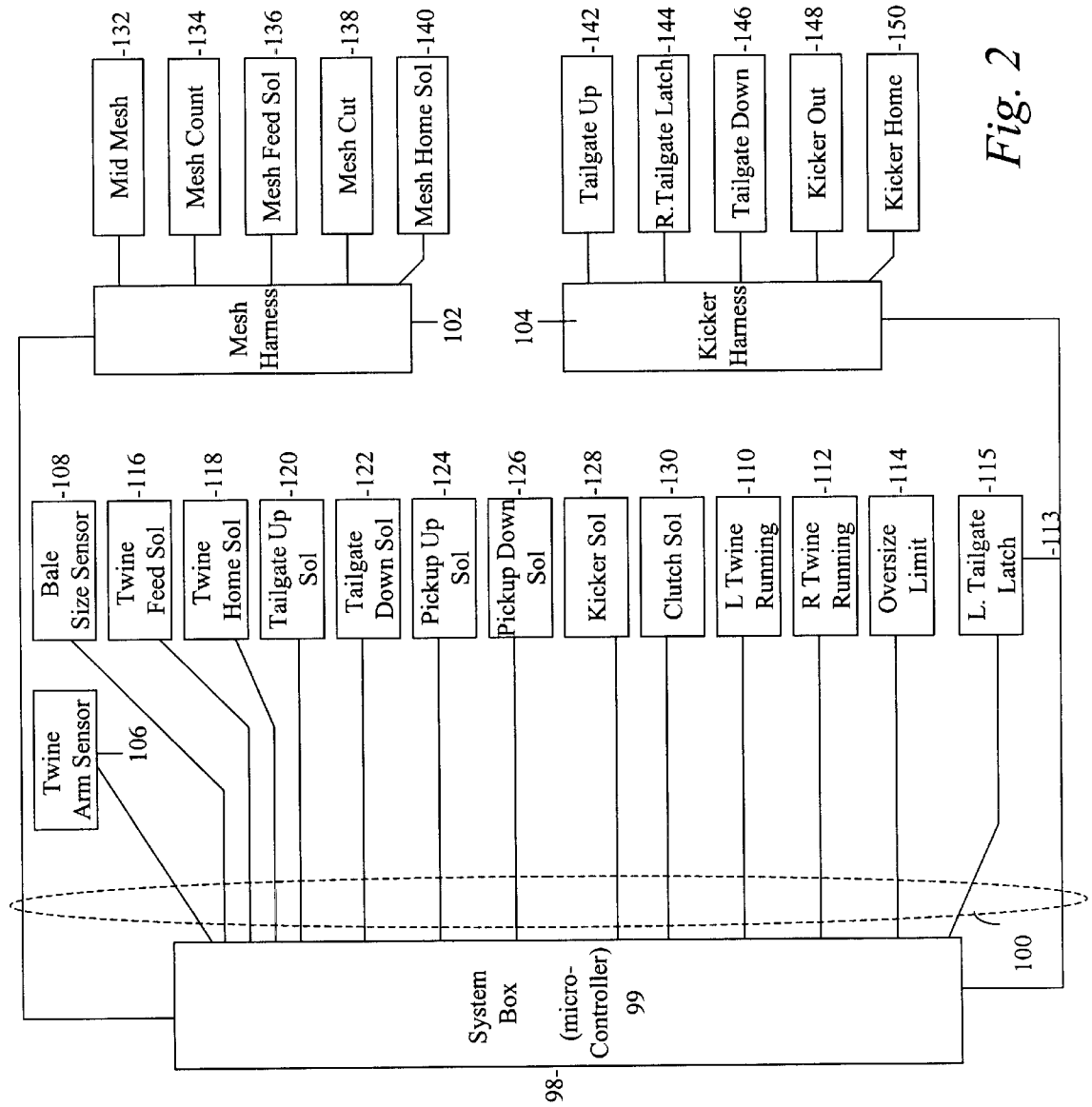
FIG. 2 is a schematic drawing of the electronic control system of the round baler of FIG. 1.

FIG. 2 is a schematic drawing of an embodiment of an electronic control system of the round baler of FIG. 1. The system of FIG. 2 comprises a system box 98 containing a microcontroller 99 and associated electronic components whose construct will be understood by one of ordinary skill but the details of which are unimportant to the present invention. Schematically depicted are three harnesses that connect the system box 98 and microcontroller 99 to elements controlled by the microcontroller that are distributed about the round baler. There is a main harness 100, a mesh harness 102, and a kicker harness 104. Although single lines are depicted running from the system box to the various elements, these lines are meant to represent multiple wired connections that run through the harnesses and are connected to the indicated elements.

Main harness 100 connects system box 98 and microcontroller 99 to five different sensors and switches including a twine arm sensor 106, a bale size sensor 108, a left twine running switch 110, a right twine running switch 112, an oversize limit switch 114 and a left tailgate latch switch 115. Bale size sensor 108 sends signals to microcontroller 99 to indicate the size of the bale during the formation cycle. Twine arm sensor 106 sends signals to microcontroller 99 to indicate the location of the twine arm if a twine wrap is being used. Likewise, left and right twine running switches 110, 112 indicate to the microcontroller when the left and right twine rolls are turning and therefore dispensing twine. Oversize limit switch 114 indicates to the microcontroller when the bale has exceeded the trip point for a maximum bale size in the chamber. Left tailgate latch switch 115 indicates whether the left tailgate latch is open or closed. A line 113 is meant to schematically indicate that left tailgate latch switch 115 is actually connected in series with right tailgate latch switch 144 (described below).

Main harness 100 also connects system box 98 and microcontroller 99 to nine different solenoids that activate the flow of hydraulic fluid to different systems of the baler. These include the twine feed solenoid 116, the twine home solenoid 118, the tailgate up solenoid 120, the tailgate down solenoid 122, the pick-up up solenoid 124, the pick-up down solenoid 126, the kicker solenoid 128, and the clutch solenoid 130 and an auxiliary solenoid (not shown). Twine feed solenoid 116 actuates the twine wrapping mechanism. Twine home solenoid 118 causes the twine arm to return to its home position. Tailgate up solenoid 120 actuates a hydraulic cylinder that lifts the tailgate. Tailgate down solenoid 122 causes the same hydraulic cylinder to close the tailgate. Pick-up up solenoid 124 actuates a hydraulic cylinder to lift the pick-up assembly into its up position. Pick-up down solenoid 126 actuates the same hydraulic cylinder to move the pick-up assembly into its down position. Kicker solenoid 128 actuates hydraulic cylinders to move the kicker out and back. Clutch solenoid 130 engages and disengages the main drive clutch to establish and suspend the driving connection between the power takeoff shaft of the tractor and the pickup, stub augers, starter roll, and belt drive rolls of the baler. The auxiliary solenoid is available to run optional equipment.

Mesh harness 102 connects the system box and microcontroller to the mid-mesh switch 132, the mesh count switch 134, the mesh feed solenoid 136, the mesh cut switch 138, and the mesh home solenoid 140. The mesh wrapping mechanism is optional and so may or may not appear on any given unit. Mid-mesh switch 132 provides position feedback to microcontroller 99 to stop the mesh dispensing roller in the correct wrapping location. Mesh count switch 134 allows the controller to estimate the amount of mesh usage and indicate the mesh is being applied. Mesh feed solenoid 136 causes the mesh to be fed to the bale chamber during the wrapping cycle. Mesh home solenoid 140 actuates a hydraulic cylinder that returns the mesh wrapping mechanism to its home position at which point a mechanical break over will cut the mesh and close mesh cut switch 138 signaling the end of the meshwrapping process to the microprocessor.

Kicker harness 104 connects the system box and microcontroller to five different switches including tailgate up switch 142, right tailgate latch switch 144, tailgate down switch 146, kicker out switch 148, and kicker home switch 150. Tailgate up switch 142 signals the microcontroller when the tailgate is in the up position. Right tailgate latch switch 144, wired in series with left tailgate latch switch 115, signals the microcontroller when the tailgate is latched. Because of the series connection between these two switches, no signal is sent unless both are closed. Tailgate down switch 146 signals the microcontroller when the tailgate is in its down position and that the kicker solenoid 128 should deenergize. Kicker out switch 148 signals the microcontroller when the kicker is in its out position and that the tailgate down solenoid 122 should energize. Kicker home switch 150 signals the microcontroller when the kicker is in its home position.

Figure 3:
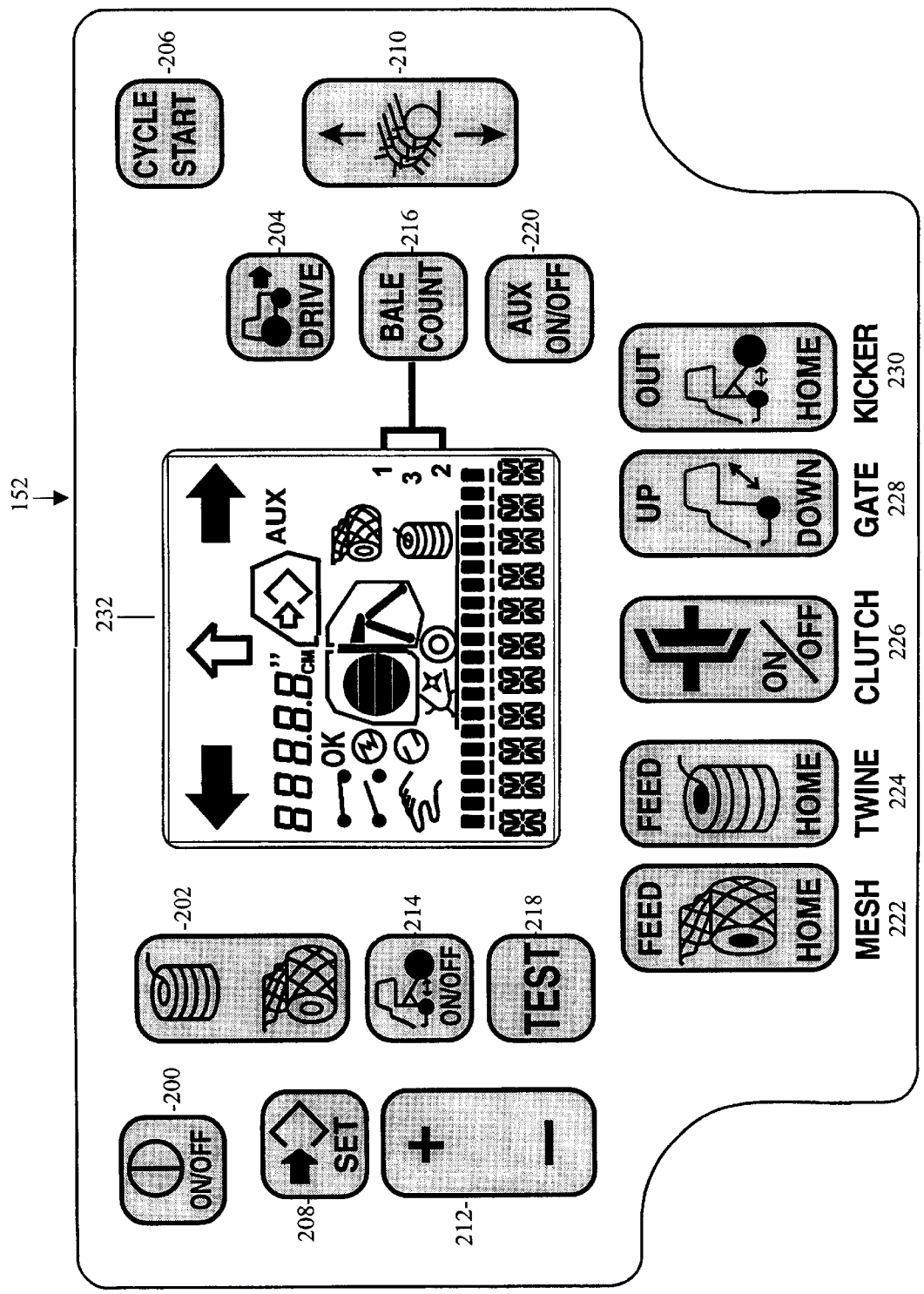
FIG. 3 is a schematic view of the control console at the tractor seat that is accessible by an operator when towing and operating the round baler of FIG. 1.

FIG. 3 is a plan view of a control console 152 at the tractor seat that is accessible by an operator when operating the round baler of the present invention. The control console 152 is configured with controls to allow full manual control of the round baler or semi-automatic control. Full manual control means that an operator signal to the microcontroller initiates each major step in the round baling process. The control console includes a power on/off button 200, a twine/mesh select button 202, a drive control button 204, a cycle start button 206, a set button 208, a pickup lift button 210, a value control button 212, a kicker on/off button 214, field/total bale count indicator 216, test button 218, and auxiliary output on/off button 220. In addition, there are five manual mode controls including mesh 222, twine 224, clutch 226, gate 228, and kicker 230. There is also a central display 232 that indicates baler status to the operator during the various baler cycles and modes of operation. In addition to the control console 152, a remote control (not shown) may also be used to handle some control functions including the cycle start function described below.

The control console 152 has the following modes of operation: (1) neutral; (2) test; (3) program; (4) drive; (5) auto; and (6) manual. The system starts in the neutral mode. At system start up certain checks are performed by the system and baler status is displayed to the operator. From the neutral mode the operator can press the test, set, drive, or any of the manual mode keys.

The test mode is entered when the operator pushes test key 218. The test mode is used to check the condition of the electrical system components of the baler. This status will be displayed on the console screen 232.

Program mode is entered by depressing set key 208. The operator uses the program mode to set the various settings for controlling baler functions. The program mode symbol will illuminate. The setting name and the value will appear on the display screen. To change a value or setting option, the operator should press the appropriate side of value key 212. The set button can be pressed again to advance to the next setting name. Among other values and settings, the baler can be set in semi-automatic mode during program mode and bale size may be selected.

There are two semi-automatic modes: auto kick and auto wrap. In auto kick mode the baler will form a bale and await a signal prior to wrapping the bale. Once wrapping is signaled, the bale is wrapped and immediately ejected without operator intervention. In autowrap mode the bale is wrapped automatically after bale formation and the baler awaits an operator signal before ejecting the wrapped bale.

The drive mode is entered by depressing drive key 204. When the drive mode is entered the clutch is engaged and the forming belts of the baler begin to turn. The operator may then drive the tractor forward pulling the baler along a windrow with the crop pickup down to form a bale. The drive mode key should be depressed whether manual mode or semi-automatic mode is going to be employed to control the baler cycles. However, if the baler has been set into semi-automatic mode, the drive key only needs to be pushed to start the baler for the first time. In semi-automatic mode, as the baler completes all of the cycles for creating and ejecting a bale it will automatically return to the drive mode for subsequent cycles as further described below.

The automatic mode is entered by first selecting one of the two semi-automatic modes, auto kick or auto wrap, during the program mode and then depressing the drive key as previously described.

The manual mode can be entered at any time by pressing one of the manual keys. Once in manual mode, the operator controls the forming cycle by controlling the clutch with the clutch button 226, the wrapping cycle by depressing either the mesh button 222 or twine button 224, and the ejecting cycle by controlling the tailgate with the gate button 228 and the kicker with the kicker button 230.

With reference to FIGS. 1–3 the baler operates as follows. The variable displacement pump (not shown) within the baler receives energy from the power take-off of the tractor and pressurizes the system. When the operator signals the beginning of the bale formation cycle by depressing drive key 204, the electronic controller sends a signal to clutch solenoid 130 which engages the clutch causing the pickup and stub augers to operate, starter roll 20 to turn, and upper and lower drive rolls 18, 22 to turn the forming belts 51. The operator tows the baler along a windrow. The picked up crop from the windrow is moved to the bale chamber opening by the stub augers of pickup assembly 14 and the center-gathered crop is then fed into the bottom of the open throat bale chamber 17 by the stuffer assembly 16. Once in bale chamber 17, the crop contacts the rough top surface of forming belts 51 which are moving upward. The forming belts carry the crop to the top of the starting chamber which is formed by the front and rear bale density rolls 46, 48. The motion of the forming belts turns the crop downward against starting roll 20. The core is started and begins to roll. Hydraulic cylinders pull down on the bale density arm 44 and belt tension 24 arms. The bale density rolls 46, 48 are held down to reduce the size of the bale chamber to a starting size. The belt tension rolls 26, 28 are held down to supply tension to the forming belts. As the bale increases in size, the bale density rolls 46, 48 and the belt tension rolls 26, 28 are forced up. The bale density rolls 46, 48 put an increasing amount of downward force against the bale. This force keeps tension on the bale and compresses the crop coming into the bale chamber. The belt tension rolls move upward to give more forming belt for the increased size of the bale within the chamber.

As the bale size increases and bale density arm 44 moves upward, bale size sensor 54 continually sends signals to microcontroller 99 indicating bale size. The microcontroller will detect when the bale has reached or exceeded the bale size originally programmed during the program mode by the operator. The bale size is also indicated on console screen 232. If the operator selected the autokick mode, then once the bale has reached maximum size the forming cycle is complete and the operator should stop forward motion of the baler in response to the indication on console screen 232. The baler awaits the operator to signal the beginning of the wrap cycle by pushing cycle start button 206. Prior to pushing the cycle start button, the operator can even up the bale by driving from one position in the windrow to another. Once the operator presses cycle start button 206 the baler enters the wrapping cycle.

In the wrapping cycle the microcontroller either activates mesh feed solenoid 136 or twine feed solenoid 116, depending upon which wrap method has been selected during the program mode, and the bale is wrapped. The twine wrap mechanism or mesh wrap mechanism perform their functions as will be readily understood by one of ordinary skill in the art. Once the wrap cycle is complete, clutch solenoid 130 is deactivated by microcontroller 99 to disengage the clutch and stop the motion of forming belts 51 and the microcontroller will immediately proceed to the ejecting cycle.

In the ejecting cycle, the microcontroller causes the tailgate to lift by actuating tailgate up solenoid 120. Once tailgate up switch 142 closes signaling the position of the tailgate to microcontroller 99, microcontroller 99 activates kicker solenoid 128 causing the kicker to push the bale away from the baler. The kicker proceeds outward until in its fully extended or out position, closing kicker out switch 148. The microcontroller then activates tailgate down solenoid 122 causing the tailgate to move to the down position and closing tailgate down switch 146 which in turn indicates the down position to microcontroller 99. The tailgate is latched closed, closing both the right and left tailgate latch switches 115, 144 which causes microcontroller 99 to deactivate kicker solenoid 128. The kicker returns home closing kicker home switch 150. The baler then immediately begins a new forming cycle.

If the operator selects the autowrap semi-automatic mode, the baler will form the bale as described above and after a short delay proceed directly to the wrap cycle without operator intervention and wrap the bale also as described above. The baler will then await operator intervention comprised of pressing cycle start key 206 or the remote cycle start switch before beginning the ejecting cycle. After receiving the operator signal, the baler will raise the tailgate, unload the bale from the chamber, send the kicker out, lower the tailgate, and send the kicker home, all as previously described. When the tailgate latches 115, 144 are closed, the drive forward arrow will illuminate on display 232. The operator can then drive forward as the baler starts a new forming cycle.

Figure 4:
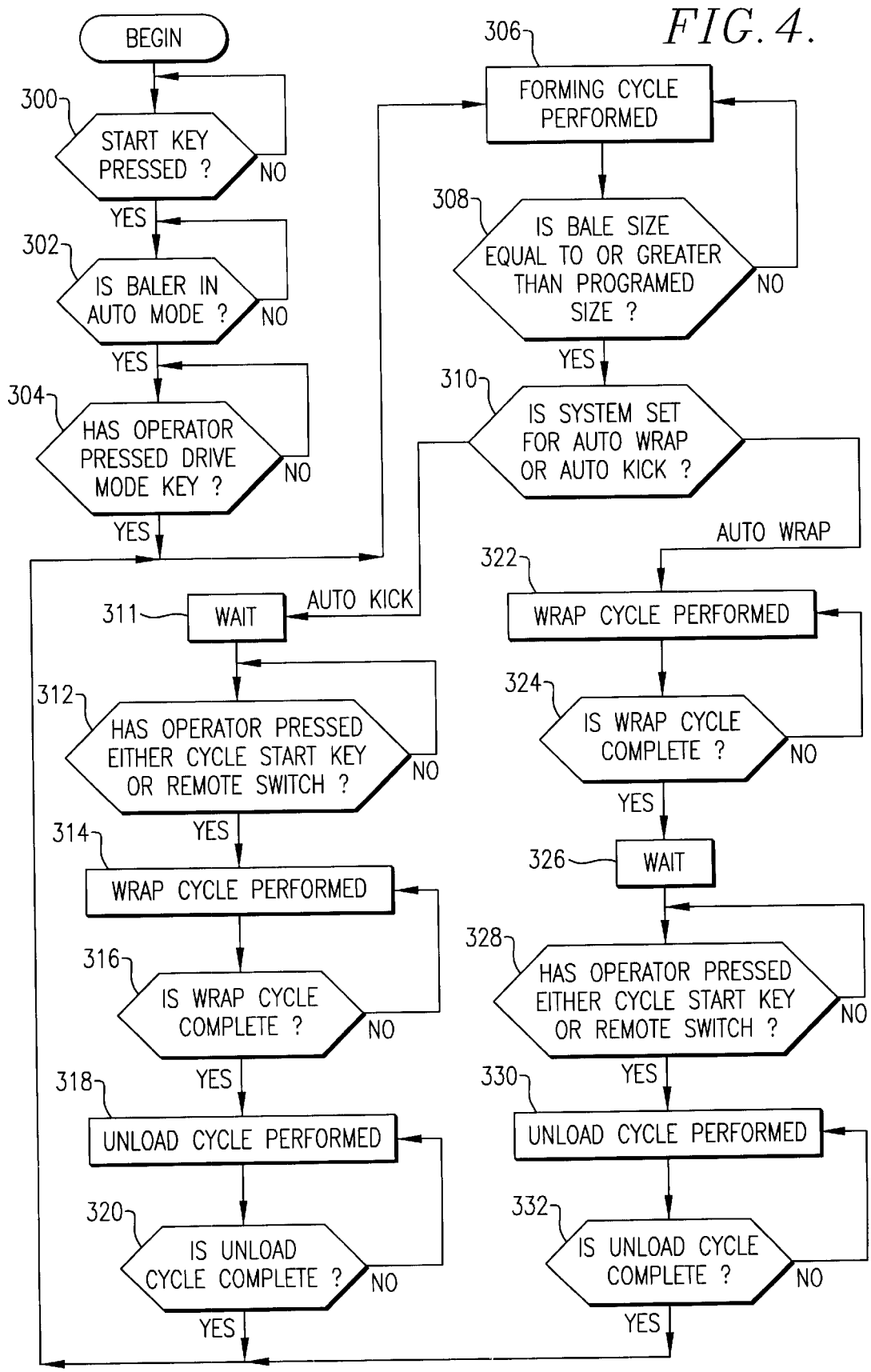
FIG. 4 is a flow diagram of an embodiment of a computer program of the present invention.

FIG. 4 is a flow diagram of the control program when it is operating in one of the two semiautomatic modes. The program begins and awaits depression of the start key by the operator at step 300. Once the operator pushes the start key, the program determines whether the baler is in auto mode at step 302. If the baler is in auto mode, the controller waits for the operator to press the drive key at step 304. Once the drive mode key is pressed the program proceeds to step 306 where the forming cycle is performed. The baler remains in the forming cycle until step 308 where it is determined that the bale size is equal to or greater than the selected size programmed by the operator during the programming mode. Once the bale size is equal to or greater than the selected size, program flow proceeds to step 310 where it is determined whether the unit is in autowrap or autokick mode. If autokick mode has been selected, the program awaits operator intervention while checking for the operator to press the cycle start or remote switch at step 312. Once the operator pushes the cycle start or remote switch, the wrap cycle is performed at step 314. The wrap cycle continues until is it determined the wrap cycle is complete at step 316. The baler then proceeds immediately to the unload cycle at step 318 and 320 during which the tailgate is lifted, the kicker is activated, the tailgate is lowered, and the kicker is returned home. The program then returns automatically to step 306 where the forming cycle begins again. At step 310, if it is determined that the baler is in autowrap mode then the system proceeds to step 322 where the wrap cycle is performed until it is determined at step 324 that the wrap cycle is complete. Once the wrap cycle is complete the baler proceeds to step 326 and 328 where it awaits operator depression of the cycle start key or remote switch. Once the operator presses the cycle start key or remote switch, the baler proceeds to step 330 where the unload cycle is performed as described above. Once the unload cycle is complete 332 the baler returns to step 306 where the forming cycle begins once again.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A method of semi-automatic control of a round baler comprising:
    providing alternatively selectable semi-automatic and manual operating modes;
    selecting the semi-automatic mode;
    providing in the semi-automatic mode a baling process that automatically sequences from a forming cycle, to a wrapping cycle, and to an ejecting cycle except for a single stop point that requires an operator input signal to start the next cycle;
    providing in the semi-automatic mode first and second alternatively selectable stop points in the sequence of cycles;
    selecting in the semi-automatic mode between the first and second stop points;
    automatically controlling the baling process in the semi-automatic mode until the selected stop point is reached;
    waiting at the stop point in the semi-automatic mode until an operator restart signal is received; and
    automatically controlling the baling process in the semi-automatic mode until completion after receiving the restart signal.

2. The method of claim 1 wherein the first stop point is between the forming cycle and the wrapping cycle.

3. The method of claim 2 wherein the second stop point is between the wrapping cycle and the ejecting cycle.

* * * * *